United States Patent
Zhang et al.

(10) Patent No.: US 12,510,496 B2
(45) Date of Patent: Dec. 30, 2025

(54) RADIOGRAPHIC INSPECTION APPARATUS AND VEHICLE-MOUNTED SECURITY INSPECTION SYSTEM

(71) Applicants: NUCTECH COMPANY LIMITED, Beijing (CN); Tsinghua University, Beijing (CN)

(72) Inventors: Li Zhang, Beijing (CN); Zhiqiang Chen, Beijing (CN); Qingping Huang, Beijing (CN); Mingzhi Hong, Beijing (CN); Yi Cheng, Beijing (CN); Minghua Qiu, Beijing (CN); Yao Zhang, Beijing (CN); Jianxue Yang, Beijing (CN); Lei Zheng, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 204 days.

(21) Appl. No.: 18/284,119

(22) PCT Filed: Jan. 14, 2022

(86) PCT No.: PCT/CN2022/072003
§ 371 (c)(1),
(2) Date: Sep. 26, 2023

(87) PCT Pub. No.: WO2022/206121
PCT Pub. Date: Oct. 6, 2022

(65) Prior Publication Data
US 2024/0151661 A1    May 9, 2024

(30) Foreign Application Priority Data
Mar. 30, 2021 (CN) .......................... 202110336800.0

(51) Int. Cl.
*G01N 23/10* (2018.01)
*G01N 23/04* (2018.01)
(Continued)

(52) U.S. Cl.
CPC ............. *G01N 23/10* (2013.01); *G01N 23/04* (2013.01); *G01V 5/20* (2024.01); *G01V 5/226* (2024.01);
(Continued)

(58) Field of Classification Search
CPC .... G01N 23/04; G01N 23/10; G01N 2223/03; G01N 2223/1016; G01N 2223/301;
(Continued)

(56) References Cited

U.S. PATENT DOCUMENTS 10,952,688 B2    3/2021   Rakie et al.
2019/0298285 A1  10/2019  Rakic et al.

FOREIGN PATENT DOCUMENTS

CN    1779446 A   *  5/2006
CN    102657537 A     9/2012
(Continued)

OTHER PUBLICATIONS

English translation of CN 1779446 (Year: 2006).*
(Continued)

*Primary Examiner* — Mark R Gaworecki
(74) *Attorney, Agent, or Firm* — Merchant & Gould P.C.

(57) ABSTRACT

A radiographic inspection apparatus and a vehicle-mounted security inspection system. The radiographic inspection apparatus includes a scanning device, where the scanning device includes: an upright framework; a slip ring rotatably provided on the upright framework; and a locking mechanism. The locking mechanism includes: a driving mechanism provided on the upright framework; and a contact portion provided on the driving mechanism to come into
(Continued)

contact with an outer ring of the slip ring under a driving of the driving mechanism, so as to prevent the slip ring from rotating relative to the upright framework.

20 Claims, 10 Drawing Sheets

(51) Int. Cl.
  *G01V 5/20* (2024.01)
  *G01V 5/226* (2024.01)
(52) U.S. Cl.
  CPC . *G01N 2223/03* (2013.01); *G01N 2223/1016* (2013.01); *G01N 2223/301* (2013.01); *G01N 2223/321* (2013.01); *G01N 2223/3303* (2013.01)
(58) Field of Classification Search
  CPC ..... G01N 2223/321; G01N 2223/3303; G01V 5/20; G01V 5/226
  See application file for complete search history.

(56) References Cited

FOREIGN PATENT DOCUMENTS

| | | |
|---|---|---|
| CN | 210652828 U | 6/2020 |
| CN | 112505791 A | 3/2021 |
| CN | 112730473 A | 4/2021 |
| CN | 112730474 A | 4/2021 |
| CN | 112730481 A | 4/2021 |
| WO | 2019191007 A1 | 10/2019 |

OTHER PUBLICATIONS

International Search Report and Written Opinion for PCT application No. PCT/CN2022/072003 dated Apr. 7, 2022 (10 pages).
English Translation of International Search Report or PCT application No. PCT/CN2022/072003 dated Apr. 13, 2022 (3 bages).
Office Action issued on Feb. 26, 2023 for Chinese application No. 202110344167.X (9 pages).

* cited by examiner

RADIOGRAPHIC INSPECTION APPARATUS AND VEHICLE-MOUNTED SECURITY INSPECTION SYSTEM

This application is a National Stage Application of International Application No. PCT/CN2022/072003, filed 14 Jan. 2022, which claims the benefit of Ser. No. 20/211, 0336800.0, filed 30 Mar. 2021 in China, and which applications are incorporated herein by reference. To the extent appropriate, a claim of priority is made to each of the above disclosed applications.

TECHNICAL FIELD

Embodiments of the present disclosure relate to a vehicle-mounted security inspection system, and in particular, to a radiographic inspection apparatus and a movable vehicle-mounted security inspection system including the radiographic inspection apparatus.

BACKGROUND

Based on requirements of public safety, a vehicle-mounted security inspection system is often used to perform a non-invasion inspection on an object such as a luggage or a package in large public places, such as large-scale exhibitions, temporary highway inspection stations, border inspection ports or stadiums. For example, a radiographic inspection apparatus provided in a vehicle is used to inspect whether a prohibited item such as a drug or an explosive exists in the object or not. An object to be inspected passes through an inspection space of the radiographic inspection apparatus by means of a conveying structure, and an X-ray emission apparatus emits X-rays into a radiographic channel, so as to achieve an inspection of the object.

In an existing vehicle-mounted security inspection system, a radiographic inspection apparatus is directly provided in a box of the vehicle. The radiographic examination apparatus generally includes a housing and a scanning device (CT machine) provided in the housing. The scanning device mainly includes a supporting frame, a slip ring rotatably provided on the supporting frame, a radiation source used to emit X-rays provided on the slip ring, a detector array provided on a side of the slip ring opposite to the radiation source, and a conveying structure passing through an approximate center of the slip ring. As the radiographic inspection apparatus is provided in the box of the vehicle, if the radiographic inspection apparatus is not operating while the vehicle is traveling, the slip ring may rotate due to vibration, which may cause a damage to the slip ring.

SUMMARY

The purpose of the present disclosure is to solve at least one aspect of the above problems and defects in related art.

According to an embodiment of an aspect of the present disclosure, a radiographic inspection apparatus is provided, including a scanning device, where the scanning device includes: an upright framework; a slip ring rotatably provided on the upright framework; and a locking mechanism. The locking mechanism includes: a driving mechanism provided on the upright framework; and a contact portion provided on the driving mechanism to come into contact with an outer ring of the slip ring under a driving of the driving mechanism, so as to prevent the slip ring from rotating relative to the upright framework.

According to an embodiment of the present disclosure, the contact portion includes: a base portion connected to the driving mechanism; and a resilient pad provided on the base portion and configured to be in contact with the outer ring of the slip ring resiliently.

According to an embodiment of the present disclosure, the driving mechanism includes a connecting rod, where a first end of the connecting rod is pivotally connected to the upright framework, and the contact portion is pivotally connected between the first end of the connecting rod and a second end of the connecting rod; a driver provided on the upright framework; and a driving rod connected between the driver and the second end of the connecting rod, and configured to reciprocate linearly relative to the driver under a driving of the driver, so as to drive the connecting rod to pivot relative to the upright framework.

According to an embodiment of the present disclosure, the driving mechanism further includes a buffer device provided between the driving rod and the second end of the connecting rod.

According to an embodiment of the present disclosure, the buffer device includes a sleeve, where a first end of the sleeve is pivotally connected to the connecting rod; and a spring provided in the sleeve, where one end of the driving rod is inserted into the sleeve so as to drive the sleeve to move by biasing the spring.

According to an embodiment of the present disclosure, the buffer device further includes an end cover provided on the sleeve; a connecting block provided at the end of the driving rod, where the connecting block is inserted into the sleeve through the end cover and abuts against the spring.

According to an embodiment of the present disclosure, the connecting block is provided with a flange, where the flange protrudes radially outward and is located on an inner side of the end cover.

According to an embodiment of the present disclosure, a limiting rod is provided between the second end of the connecting rod and a position where the connecting rod is connected to the contact portion, where the base portion is provided with a limiting block configured for receiving the limiting rod.

According to an embodiment of the present disclosure, the locking mechanism further includes: a first proximity switch provided on the upright framework; and a matching switch provided on the connecting rod, where the driver is configured to stop driving the contact portion to move further toward the slip ring in response to the matching switch approaching the first proximity switch.

According to an embodiment of the present disclosure, the locking mechanism further includes a second proximity switch provided on the upright framework, where the driver is configured to stop driving the contact portion to move further away from the slip ring in response to the mating switch approaching the first proximity switch.

According to an embodiment of the present disclosure, the locking mechanism further includes: a first mounting seat provided on the upright framework, where the driver is provided on the first mounting seat; and a second mounting seat provided on the upright framework, where the first end of the connecting rod is pivotally connected to the second mounting seat.

According to an embodiment of another aspect of the present disclosure, a vehicle-mounted security inspection system is provided, including: a vehicle; and a radiographic inspection apparatus of any of the above embodiments provided on a chassis of the vehicle.

According to an embodiment of the present disclosure, the chassis includes: a main body portion; and a horizontal framework integrally connected with the main body portion, where the horizontal framework includes a pair of longitudinal supporting beams and a pair of lateral supporting beams, the upright framework is provided on one of the longitudinal supporting beam or the lateral supporting beam, and at least part of the upright framework is lower than an upper surface of the horizontal framework.

According to an embodiment of the present disclosure, the upright framework is provided on the horizontal framework through two groups of connecting mechanisms, and each group of connecting mechanisms includes a horizontal arm extending outward from an outer side of the upright framework and supported on the longitudinal supporting beam or the lateral supporting beam.

According to an embodiment of the present disclosure, each group of connecting mechanisms further includes: an upright arm provided on an outer side of the upright framework, and the horizontal arm is connected to a lower end of the upright arm.

According to an embodiment of the present disclosure, each group of connecting mechanisms further includes: a plurality of reinforcing ribs connected between the upright arm and the horizontal arm.

According to an embodiment of the present disclosure, the two groups of connecting mechanisms are provided on both sides of the upright framework, respectively, and located between a lower end of the upright framework and an upper end of the upright framework, so that at least part of the upright framework is lower than an upper surface of the horizontal framework.

According to an embodiment of the present disclosure, a height of the main body portion from a ground is greater than a height of the horizontal framework from the ground.

According to an embodiment of the present disclosure, the vehicle includes: a plurality of supporting legs provided on the chassis. Each supporting leg is in a retracted state of retracting towards the chassis or in an expanded state of extending towards a ground to support a weight of the vehicle.

According to an embodiment of the present disclosure, the vehicle-mounted security inspection system further includes: a level sensor configured to detect a levelness of the scanning device; and a controller configured to adjust an expansion degree of at least one of the plurality of supporting legs according to the levelness measured by the level sensor, so that the scanning device remains in a predetermined posture.

DETAILED DESCRIPTION OF EMBODIMENTS

With reference to accompanying drawings in embodiments of the present disclosure, the technical solution in embodiments of the present disclosure will be described clearly and completely. It is clear that embodiments described are some embodiments of the present disclosure, rather than all embodiments. The description of at least one exemplary embodiment below is actually only explanatory, and it will never be used as any limitation on the present disclosure and its application or use. Based on embodiments in the present disclosure, all other embodiments derived by those of ordinary skill in the art without creative work fall within the scope of protection of the present disclosure.

In the following detailed descriptions, for purposes of explanation, many specific details are elaborated to provide a comprehensive understanding of embodiments of the present disclosure. However, it is clear that one or more embodiments may be implemented without these specific details. In other cases, well-known structures and devices are illustrated to simplify the accompanying drawings. It may not be discussed in details about technologies, methods and devices known by those of ordinary skill in the art in related fields, but in an appropriate case, the technologies, methods and devices should be regarded as a part of the granted description.

In the description of the present disclosure, it should be understood that an orientation or position relationship indicated by terms such as "front, back, up, down, left, right", "lateral, longitudinal, vertical, horizontal" and "top, bottom" and other positions is based on an orientation or position relationship shown in the drawings and a travelling direction of a vehicle, and is used for the convenience of describing the present disclosure and simplifying the description. Unless otherwise stated, these orientation terms do not indicate and imply devices or elements referred to that must have a specific orientation or be constructed and operated in a specific orientation, so it should not be understood as a limitation on the scope of protection of the present disclosure. The orientation term "inside" or "outside" refers to an inside or an outside relative to a contour of a component itself.

In the description of the present disclosure, it should be understood that it is to facilitate differences in corresponding parts, by using terms "first" and "second" to define parts. Unless otherwise stated, the above terms have no special meaning, which should not be understood as a limitation on the scope of protection of the present disclosure.

According to a general concept of the present disclosure, a radiographic inspection apparatus is provided, including a scanning device, where the scanning device includes: an upright framework; a slip ring rotatably provided on the upright framework; and a locking mechanism. The locking mechanism includes: a driving mechanism 71 provided on the upright framework; and a contact portion provided on the driving mechanism to come into contact with an outer ring of the slip ring under a driving of the driving mechanism, so as to prevent the slip ring from rotating relative to the upright framework.

Figure 1:
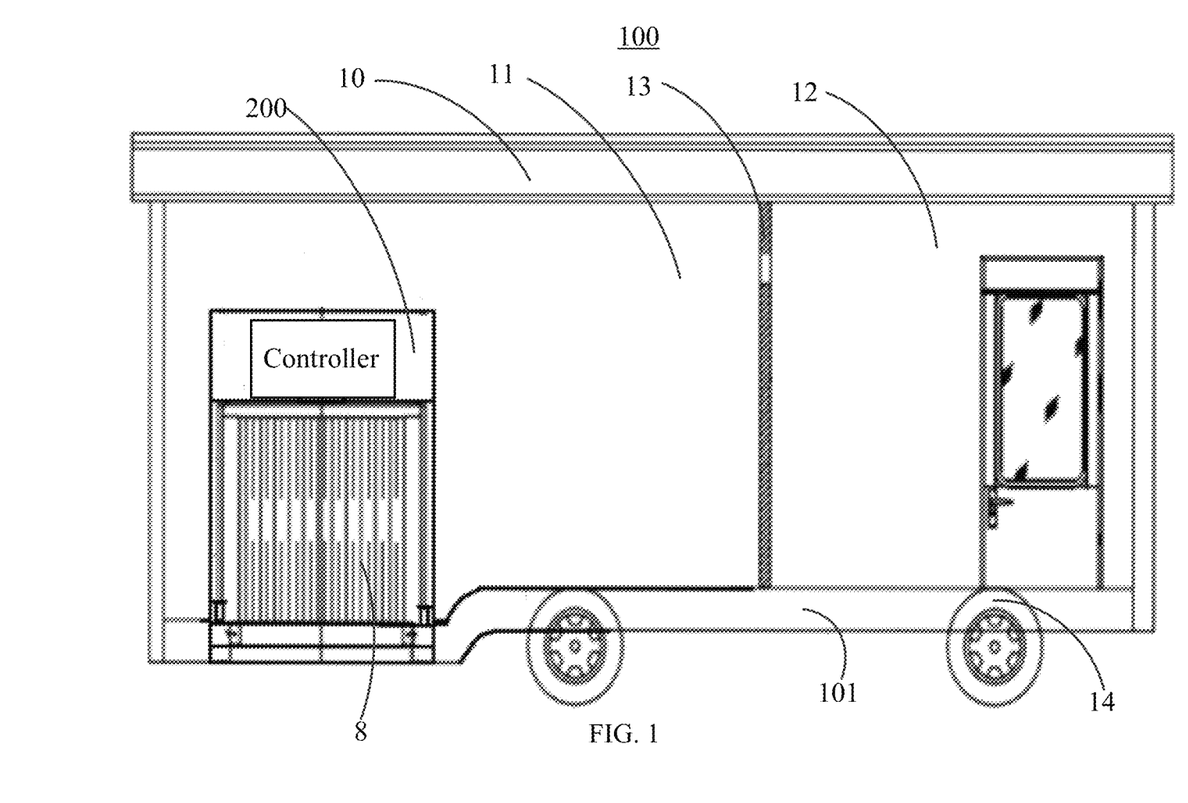
FIG. 1 shows a side view of a vehicle-mounted security inspection system of an exemplary embodiment of the present disclosure.
Figure 2:
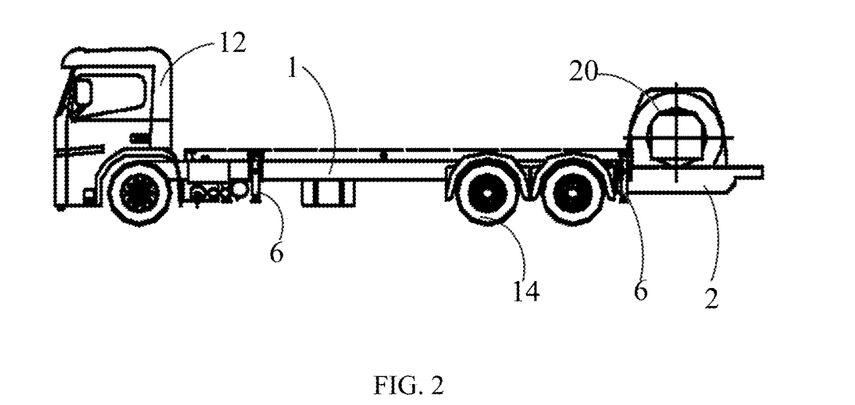
FIG. 2 shows a simplified side view of an interior of the vehicle-mounted security inspection system shown in FIG. 1.
Figure 3:
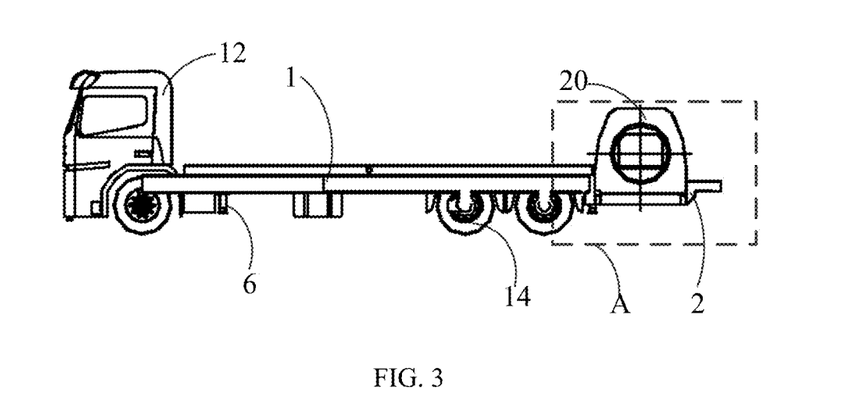
FIG. 3 shows a partial longitudinal cross-sectional view of the vehicle-mounted security inspection system shown in FIG. 2.
Figure 4:
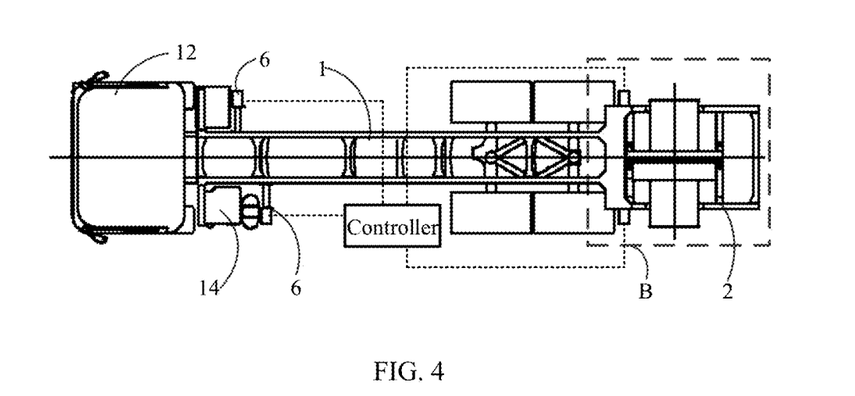
FIG. 4 shows a top view of the vehicle-mounted security inspection system shown in FIG. 2.

FIG. 1 shows a side view of a vehicle-mounted security inspection system of an exemplary embodiment of the present disclosure. FIG. 2 shows a simplified side view of an interior of the vehicle-mounted security inspection system shown in FIG. 1. FIG. 3 shows a partial longitudinal cross-sectional view of the vehicle-mounted security inspection system shown in FIG. 2. FIG. 4 shows a top view of the vehicle-mounted security inspection system shown in FIG. 2.

In an exemplary embodiment, with reference to FIGS. 1 to 4, a vehicle-mounted security system 100 is used to inspect whether a prohibited item such as a drug and an explosive exists in luggage, packages, handbags or other objects in places with high mobility of people such as stations, airports, stadiums or shopping malls. The vehicle-mounted security inspection system 100 includes a vehicle 10 and a scanning device 20 of a radiographic inspection apparatus 200 provided on the vehicle. The vehicle 10 includes a chassis 101, a box 11 provided on the chassis, a driving room 12, a partition 13 used to separate the driving room 12 and the box 11, and wheels 14 provided on a lower portion of the chassis.

Figure 5:
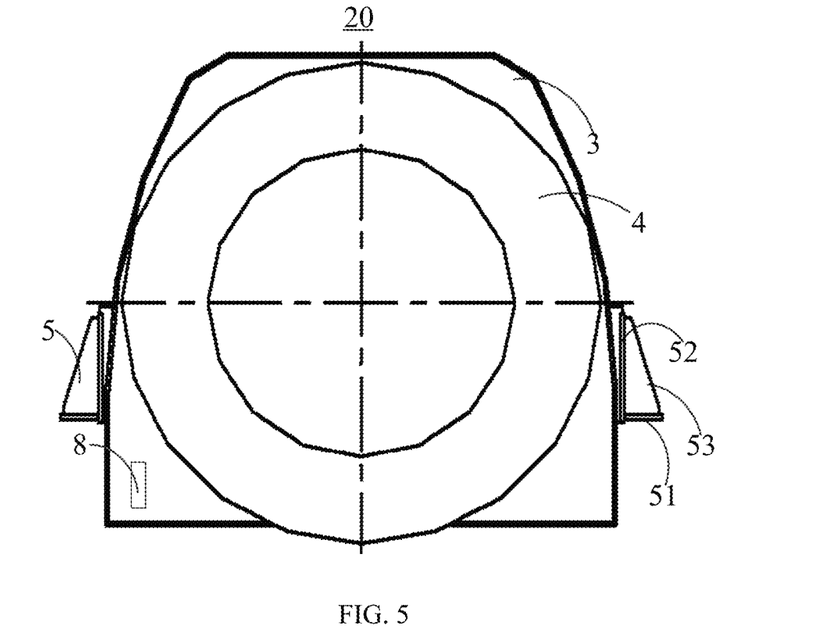
FIG. 5 shows a simplified front view of a radiographic inspection apparatus of an exemplary embodiment of the present disclosure.
Figure 6:
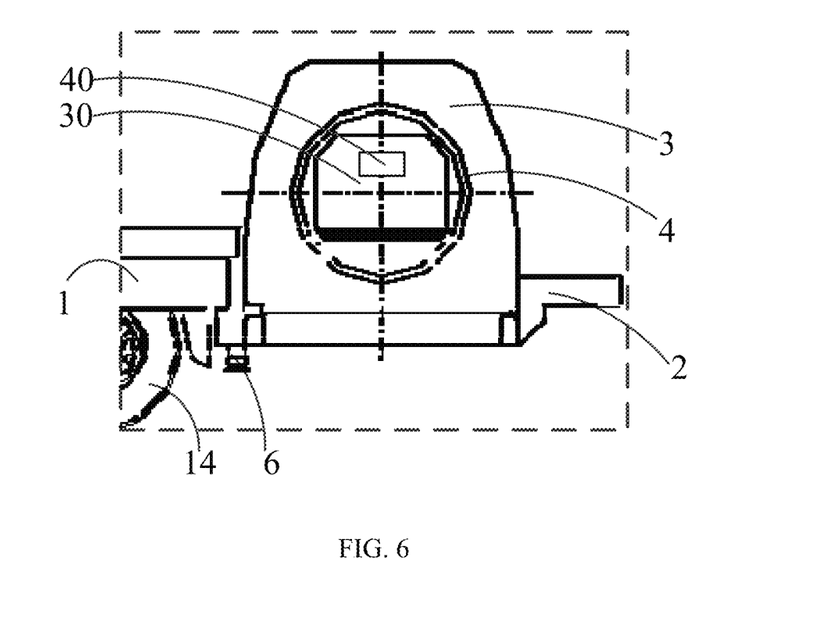
FIG. 6 shows an enlarged schematic diagram of part A shown in FIG. 3.
Figure 7:
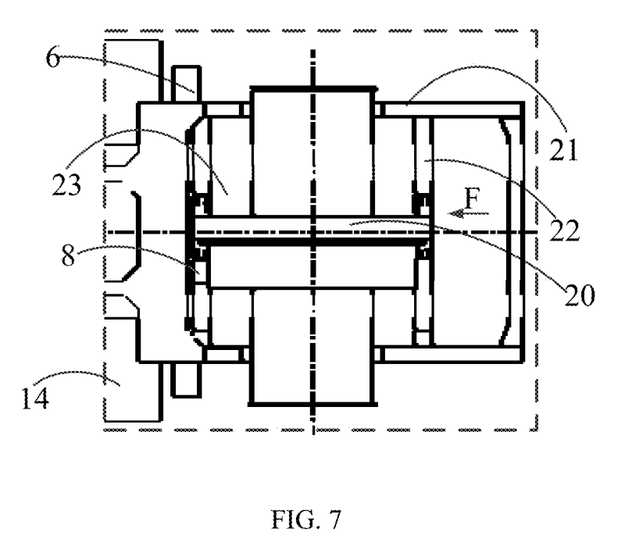
FIG. 7 shows an enlarged schematic diagram of part B shown in FIG. 4.
Figure 8:
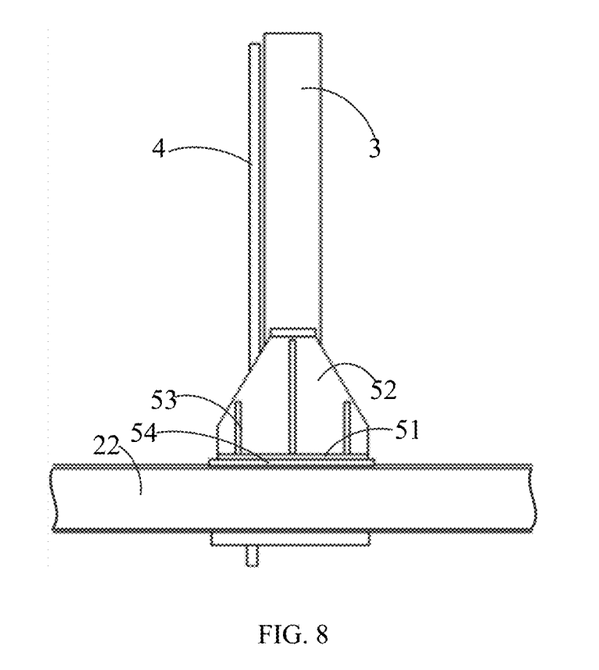
FIG. 8 shows a partial rear view viewed from position F in FIG. 7.

FIG. 5 shows a simplified front view of a radiographic inspection apparatus of an exemplary embodiment of the present disclosure. FIG. 6 shows an enlarged schematic diagram of part A shown in FIG. 3. FIG. 7 shows an enlarged schematic diagram of part B shown in FIG. 4. FIG. 8 shows a partial rear view viewed from position F in FIG. 7.

In an exemplary embodiment, with reference to FIGS. 1 to 8, the radiographic inspection apparatus 200 includes: a radiation source (not shown) used to emit X-rays and a detector array (not shown) used to receive X-rays located on opposite sides of the slip ring 4, a conveying structure 30 used to carry an object 40 to move through the slip ring 4, and a shielding curtain 8 provided at an entrance and an exit of the radiographic inspection apparatus. The radiographic inspection apparatus 200 further includes a controller used to receive electrical signals from various sensors and control operations of related devices (such as radiation sources, driving mechanisms, etc.) of the radiographic inspection apparatus.

Figure 9:
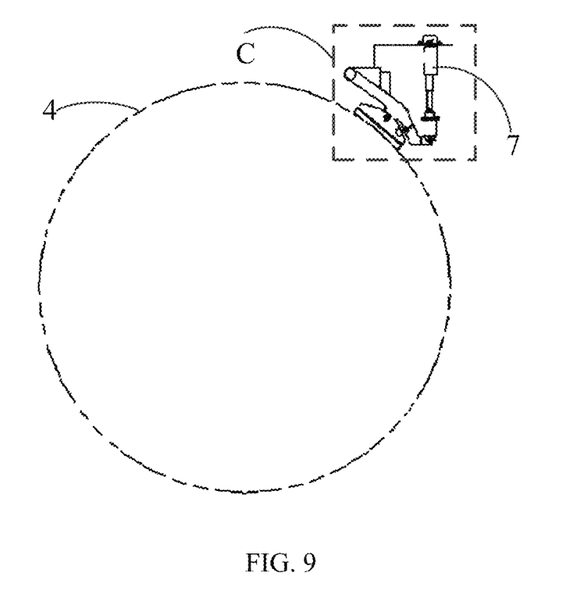
FIG. 9 shows a simplified schematic diagram of a combination of a locking mechanism and a slip ring according to an exemplary embodiment of the present disclosure, in which the locking mechanism is in an unlocked state.
Figure 10:
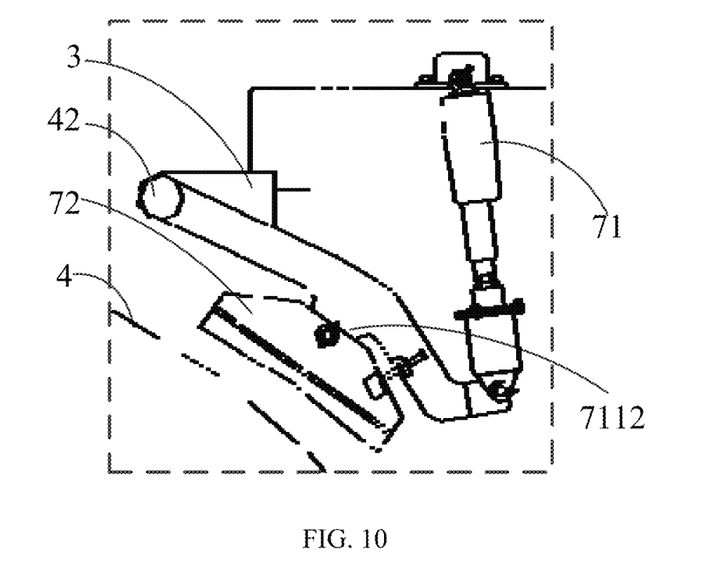
FIG. 10 shows an enlarged schematic diagram of part C shown in FIG. 9.
Figure 11:
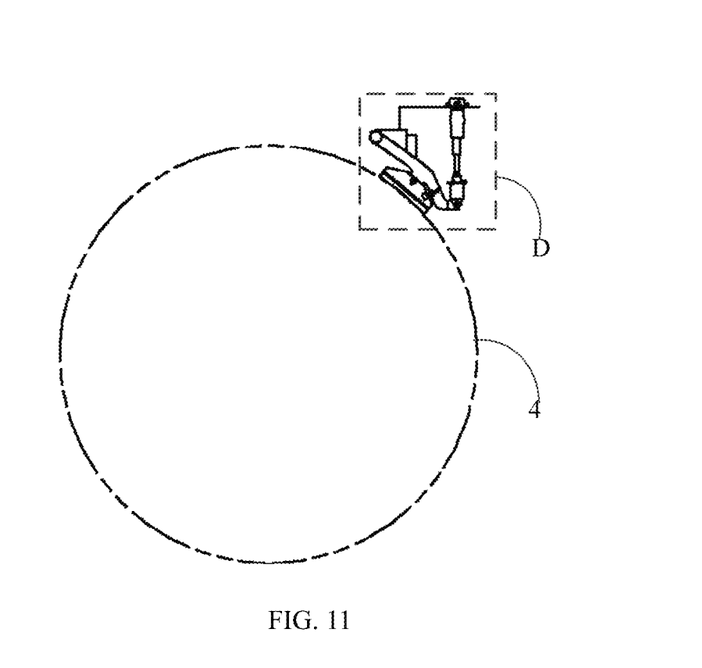
FIG. 11 shows a simplified schematic diagram of the combination of the locking mechanism and the slip ring shown in FIG. 9, in which the locking mechanism is in a locked state.
Figure 12:
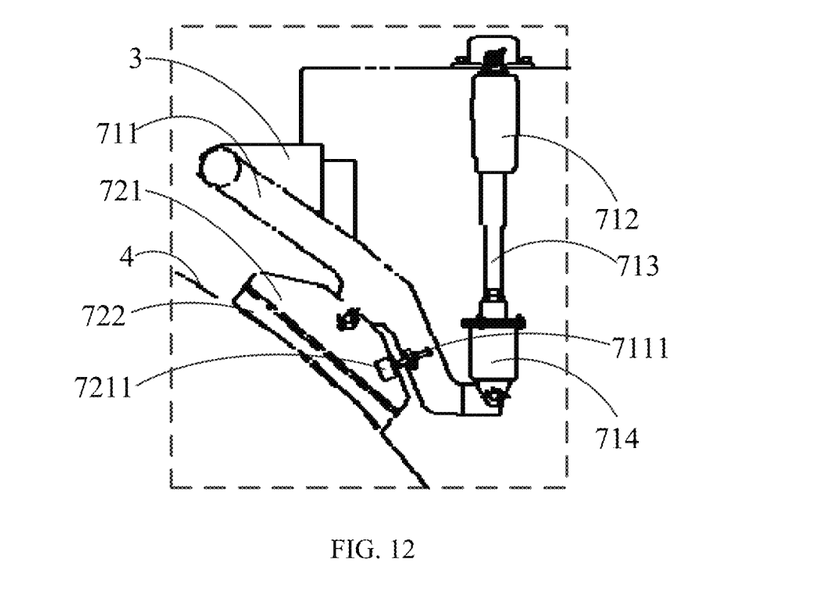
FIG. 12 shows an enlarged schematic diagram of part D shown in FIG. 9.
Figure 13:
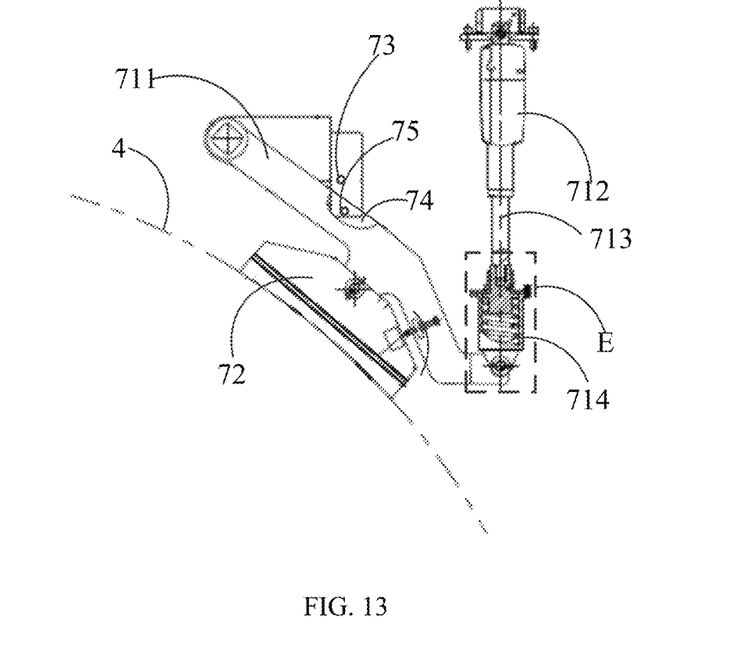
FIG. 13 shows another simplified schematic diagram of a combination of a locking mechanism and a slip ring according to an exemplary embodiment of the present disclosure, in which the locking mechanism is in a locked state.
Figure 14:
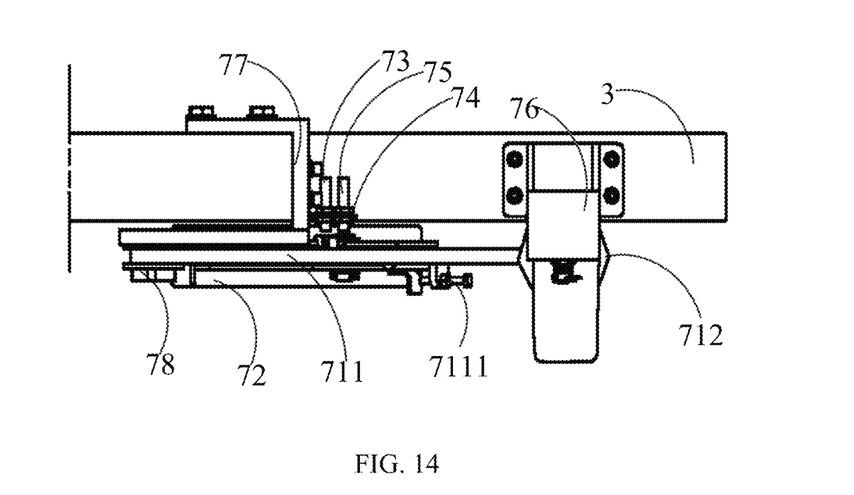
FIG. 14 shows a top view of FIG. 13.
Figure 15:
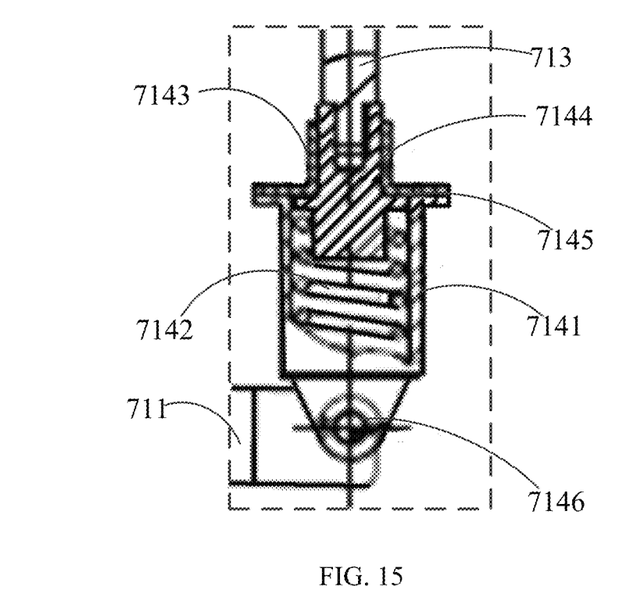
FIG. 15 shows an enlarged schematic diagram of part E shown in FIG. 13.

FIG. 9 shows a simplified schematic diagram of a combination of a locking mechanism and a slip ring according to an exemplary embodiment of the present disclosure, in which the locking mechanism is in an unlocked state. FIG. 10 shows an enlarged schematic diagram of part C shown in FIG. 9. FIG. 11 shows a simplified schematic diagram of the combination of the locking mechanism and the slip ring shown in FIG. 9, in which the locking mechanism is in a locked state. FIG. 12 shows an enlarged schematic diagram of part D shown in FIG. 9. FIG. 13 shows another simplified schematic diagram of a combination of a locking mechanism and a slip ring according to an exemplary embodiment of the present disclosure, in which the locking mechanism is in a locked state. FIG. 14 shows a top view of FIG. 13. FIG. 15 shows an enlarged schematic diagram of part E shown in FIG. 13.

In an exemplary embodiment, as shown in FIGS. 5, 9 to 15, the radiographic examination apparatus 200 includes a scanning device 20. The scanning device 20 includes: an upright framework 3; a slip ring 4 rotatably provided on the upright framework 3; and a locking mechanism 7. The locking mechanism 7 includes: a driving mechanism 71 provided on the upright framework 3; and a contact portion 72. The contact portion 72 is provided on the driving mechanism 71 to come into contact with an outer ring of the slip ring 4 by moving in a radial direction under a driving of the driving mechanism 71, so as to prevent the slip ring 4 from rotating relative to the upright framework 3. In this way, when the scanning device 20 is in an idle state, the locking mechanism 7 locks the slip ring 4 to prevent the slip ring 4 from rotating, so as to prevent key components of the scanning device 20 such as a radiation source and a detector array from being damaged during a movement of the vehicle 10. Furthermore, the contact portion 72 moves in the radial direction and is in close contact with the outer ring of the slip ring 4 to generate a frictional force, so that the slip ring 4 is prevented from rotating relative to the upright framework 3. The locking mechanism 7 may lock the slip ring 4 at any time, without being limited by a specific position of the slip ring 4, thereby improving a flexibility of braking the slip ring.

In an exemplary embodiment, as shown in FIGS. 9 to 15, the contact portion includes: a base portion 721 connected to the driving mechanism 71; and a resilient pad 722 provided on the base portion 721. The resilient pad 722 is used to be in contact with the outer ring of the slip ring 4 resiliently, so as to protect the slip ring 4 from being damaged during braking.

In an exemplary embodiment, as shown in FIGS. 9 to 15, the driving mechanism includes: a connecting rod 711, where a first end of the connecting rod 711 may be pivotally connected to the upright framework 3, and the contact portion 72 may be pivotally connected between the first end of the connecting rod 711 and a second end of the connecting rod 711; a driver 712 provided on the upright framework 4; and a driving rod 713 connected between the driver 712 and the second end of the connecting rod 711, and used to reciprocate linearly relative to the driver under a driving of the driver 712, so as to drive the connecting rod 711 to pivot relative to the upright framework 3.

In an exemplary embodiment, the driver 712 includes a pneumatic cylinder or a hydraulic cylinder. The driving rod 713 includes a piston rod driven by the pneumatic cylinder or the hydraulic cylinder. In an alternative embodiment, the driver includes a motor, and the motor drives the connecting rod 711 to rotate relative to the upright framework 3 through a combination of a turbine and a worm used as the driving rod.

In an exemplary embodiment, as shown in FIGS. 9 to 15, the driving mechanism 71 further includes a buffer device 714 provided between the driving rod 713 and the second end of the connecting rod 711. When the locking mechanism 7 is in a locked state, the buffer device 714 may provide a predetermined pressing force for the contact portion 72, so as to cause the contact portion 72 to press the outer ring of the slip ring 4 with a substantially constant pressing force.

In an exemplary embodiment, with reference to FIGS. 12, 13 and 15, the buffer device 714 includes: a sleeve 7141, where a first end of the sleeve 7141 provides a pivot 7146 that may be pivotally connected to the connecting rod 711; and a spring 7142 provided in the sleeve 7141, where an end of the driving rod 713 is inserted into the sleeve 7141, so as to drive the sleeve 7141 to move by biasing the spring 7142.

In an exemplary embodiment, the buffer device further includes: an end cover 7143 provided on the sleeve 7141; and a connecting block 7144 provided at the end of the driving rod 713. The connecting block 7144 is inserted into the sleeve 7141 through the end cover 7143 and abuts against the spring 7142. Furthermore, the connecting block 7144 is provided with a flange 7145, where the flange 7145 protrudes radially outward and is located on an inner side of the end cover 7143. In this way, the connecting block 7144 abuts against an end of the spring 7142 through the flange 7145, so as to exert a bias force to the spring 7142. In an aspect, during a release process of the locking mechanism 7, the flange 7145 abuts against the end cover 7143, the buffer device 714 is driven to move, and the contact portion 72 is driven to move away from the slip ring 4 through the connecting rod 711, so as to allow the slip ring 4 to rotate.

In an exemplary embodiment, with reference to FIGS. 10, 12 to 14, a limiting rod 7111 is provided between the second end of the connecting rod 711 and a position where the connecting rod 711 is connected to the contact portion 72. The base portion 721 of the contact portion 72 is provided with a limiting block 7211 for receiving the limiting rod 7111. During a process that the connecting rod 711 gradually drives the contact portion 72 to approach the slip ring 4, it is possible to prevent the contact portion 72 from rotating, so that the contact portion 72 may be stably pressed on the outer ring of the slip ring 4.

In an exemplary embodiment, as shown in FIGS. 13 to 14, the locking mechanism 7 further includes a first proximity switch 73 provided on the upright framework 3; and a mating switch 74 provided on the connecting rod 711. The driver 712 is used to stop driving the contact portion 73 to move further toward the slip ring 4 in response to the mating switch 74 approaching the first proximity switch 73. The locking mechanism further includes a second proximity switch 75 provided on the upright framework 3. The driver 712 is used to stop driving the contact portion 72 to move further away from the slip ring 4 in response to the mating switch 74 approaching the first proximity switch 73. In this way, the mating switch 74 cooperates with the first proximity switch 73 and the second proximity switch 75, so that a rotation range of the connecting rod 711 may be limited.

In an exemplary embodiment, the first proximity switch 73 and the second proximity switch 75 are electromagnetically coupled with the mating switch 74 through an inductive induction. For example, each of the first proximity switch 73 and the second proximity switch 75 includes a transmitting coil. The mating switch 74 includes a receiving coil electromagnetically coupled with the transmitting coil. In an alternative embodiment, the first proximity switch 73 and the second proximity switch 75 are electrically connected to the mating switch 74 through an electrical contact.

During a locking operation performed by the locking mechanism 7, as shown in FIGS. 12 and 13, a controller of the scanning device 20 of the radiographic inspection apparatus controls the driver 712 to drive the driving rod 713 to extend downwards, and the driving rod 713 drives the connecting rod 711 to rotate clockwise, thereby driving the contact portion 72 to approach the outer ring of the slip ring 4. When the controller receives an electrical signal indicating that the mating switch 74 on the connecting rod 711 is close to the first proximity switch 73, the controller controls the driver 712 to stop driving the driving rod 713, and the contact portion 72 remains in a state of pressing the slip ring 4, so that the slip ring stops rotating.

During an operation that the locking mechanism 7 releases the contact portion 72, as shown in FIGS. 10, 12 and 13, the controller of the scanning device 20 of the radiographic inspection apparatus controls the driver 712 to drive the driving rod 713 to retract toward the driver, and the driving rod 713 drives the connecting rod 711 to rotate counter-clockwise, thereby driving the contact portion 72 to move away from the outer ring of the slip ring 4. When the controller receives an electrical signal indicating that the mating switch 74 on the connecting rod 711 moves away from the first proximity switch 73, the controller controls the driver 712 to stop driving the driving rod 713, and the contact portion 72 remains in a state far away from the slip ring 4, thereby allowing the slip ring to rotate.

In an exemplary embodiment, as shown in FIGS. 9 to 15, the locking mechanism 7 further includes a first mounting seat 76 and a second mounting seat 77. The first mounting seat 76 is provided on the upright framework 3, and the driver 712 is provided on the first mounting seat 76. The second mounting seat 77 is provided on the upright framework 3, and the first end of the connecting rod 711 is pivotally connected to the second mounting seat 77 through a pivot 78. The first mounting seat 76 and the second mounting seat 77 extend from a front portion of the upright framework 3, so that the contact portion 72 is disposed on a side of the outer ring of the slip ring 4.

With reference to FIGS. 1 to 8, according to an embodiment of another aspect of the present disclosure, a vehicle-mounted security inspection system 100 is provided, including a vehicle 10 and a radiographic inspection apparatus 200 described in any one of the above embodiments provided on the vehicle 10.

In an exemplary embodiment, as shown in FIGS. 1 to 8, the chassis 101 of the vehicle 10 includes a main body portion 1 placed horizontally; and a horizontal framework 2 integrally connected with the main body portion 1. The horizontal framework 2 includes a pair of longitudinal supporting beams 21 disposed in a travelling direction of the vehicle and a pair of lateral supporting beams 22. The pair of longitudinal supporting beams 21 and the pair of lateral supporting beams 22 define a substantially rectangular accommodation space 23. The upright framework 3 is provided on the lateral supporting beams 22. At least part of the upright framework 3 is lower than an upper surface of the horizontal framework 2. That is to say, at least part of a lower portion of the upright framework 3 is accommodated in the accommodation space 23.

According to the vehicle-mounted security inspection system 100 of embodiments of the present disclosure, as at least part of the upright framework 3 is lower than the upper surface of the horizontal framework 2, a conveying structure 30 of the radiographic inspection apparatus for conveying an object 40 to be inspected is also lowered accordingly, thereby facilitating relevant personnel to place the object 40 to be inspected on the conveying structure 30 or take out the inspected object 40 from the conveying structure 30. In addition, as a height of the slip ring 4 is correspondingly reduced, stabilities of the radiation source and the detector array provided on the slip ring may be improved.

In an exemplary embodiment, the upright framework 3 is provided on the horizontal framework 2 through two groups of connecting mechanisms 5. Each group of the connecting mechanisms 5 includes a horizontal arm 51 extending outward from an outer side of the upright framework 3 and supported on the lateral supporting beam 22.

In an exemplary embodiment, each group of connecting mechanisms 5 further includes: an upright arm 52 provided on an outer side of the upright framework 3. The horizontal arm 51 is connected to a lower end of the upright arm 52. In this way, a supporting strength of the horizontal arm 51 may be increased. Furthermore, each group of connecting mechanisms 5 further includes a plurality of reinforcing ribs 53 connected between the upright arm 52 and the horizontal arm 51, so as to further increase the supporting strength of the horizontal arm 51. A backing plate 54 may be pre-welded on the lateral supporting beam 22 of the horizontal framework 2, so as to increase a supporting strength of the lateral supporting beam 22. For example, the horizontal arm 51 of the connecting mechanism 5 may be fixed to the lateral supporting beam 22 by means of a bolt assembly.

In an exemplary embodiment, as shown in FIGS. 1 to 8, the two groups of connecting mechanisms 5 are provided on both sides of the upright framework 3, respectively, and located between a lower end of the upright framework 3 and an upper end of the upright framework 3, so that at least part of the upright framework 3 is lower than an upper surface of the horizontal framework 2. That is to say, at least part of the lower portion of the upright framework 3 is accommodated in the accommodation space 23. As at least part of the upright framework 3 is lower than the upper surface of the horizontal framework 2, a conveying structure 30 of the radiographic inspection apparatus for conveying an object 40 to be inspected is also lowered accordingly, thereby facilitating relevant personnel to place the object 40 to be inspected on the conveying structure 30 or take out an inspected object 40 from the conveying structure 30. In addition, as a height of the slip ring 4 is correspondingly reduced, the stabilities of the radiation source and the detector array provided on the slip ring may be improved.

According to an exemplary embodiment of the present disclosure, as shown in FIGS. 3 and 6, a height of the main body portion 1 of the chassis from a ground is greater than a height of the horizontal framework 2 from the ground. In this way, it is possible to further reduce a height of the inspection device from the ground.

According to an exemplary embodiment of the present disclosure, as shown in FIG. 5, a level sensor 8 is provided on the upright framework 3. In this way, the level sensor 8 may more accurately measure a placement posture of the scanning device 20.

According to an exemplary embodiment of the present disclosure, the vehicle 100 further includes a plurality of supporting legs 6 provided on the chassis 101. Each supporting leg is in a retracted state of retracting towards the chassis 101 or in an expanded state of extending towards a ground to support a weight of the vehicle 10.

According to an exemplary embodiment of the present disclosure, as shown in FIGS. 1 to 8, and as shown in FIGS. 2 to 8, the vehicle-mounted security inspection system 100 also includes a level sensor 8 and a controller. The level sensor 8 is used to detect a levelness of the scanning device 20. The controller is used to adjust an expansion degree of at least one of the plurality of supporting legs 6 according to the levelness measured by the level sensor 8, so that the scanning device 20 remains in a predetermined posture. In an embodiment, the level sensor 8 is provided on a horizontal mounting surface used to mount the lateral supporting beam 22 of the upright framework 3, and/or is provided on the upright framework 3.

In the present disclosure, the technical term "predetermined posture" refers to an optimal placement posture of the scanning device with an optimal measurement accuracy. For example, the optimal placement posture may be a posture that the scanning device presents when the scanning device is placed on a horizontal plane. A plane of a circumference of the slip ring of the scanning device is perpendicular to the horizontal plane, and a virtual rotation axis of the slip ring is parallel to the horizontal plane. The levelness refers to an angle of a mounting surface of a mounting base relative to the horizontal plane, which changes due to an unevenness of the ground, in a case that the mounting base of the level sensor is provided in a certain initial posture (reference levelness). Those of ordinary skill in the art understand that there is a fixed correspondence between the initial mounting posture of the level sensor and the optimal placement posture of the scanning device. Therefore, the greater a deviation of the measured levelness from the initial mounting posture (reference levelness), the greater a deviation of a real-time measurement accuracy of the scanning device from the optimal measurement accuracy; conversely, the smaller the deviation of the measured levelness from the initial mounting posture, the smaller the deviation of the real-time measurement accuracy of the scanning device from the optimal measurement accuracy.

According to the vehicle-mounted security inspection system 100 of embodiments of the present disclosure, the controller adjusts an expansion degree of at least one of the plurality of supporting legs according to the levelness measured by the level sensor, so that the scanning device remains in a predetermined posture, that is, the scanning device remains in the optimal placement posture with the optimal measurement accuracy. In this way, no matter how uneven the ground on which the vehicle 10 is parked, a parking posture of the vehicle may be adjusted by adjusting the extension degree of the supporting leg, so that the scanning device remains in the optimal placement posture with the optimal measurement accuracy, thereby improving an inspection accuracy of the radiographic inspection apparatus. Furthermore, the vehicle-mounted security inspection system of the present disclosure may maintain that the slip ring of the scanning device is perpendicular to the horizontal plane in an operation state and the virtual rotation axis of the slip ring is parallel to the horizontal plane, so as to reduce a risk of a damage to the slip ring and improve a service life of the slip ring. In addition, it is possible to ensure the stabilities of the radiation source and the detector array provided on the slip ring.

Figure 16:
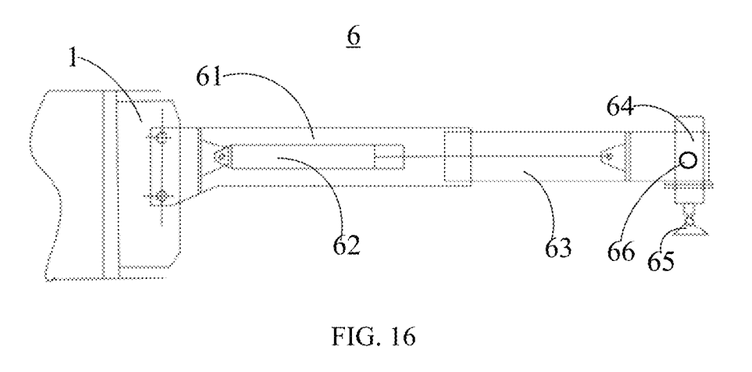
FIG. 16 shows a simplified schematic diagram of a supporting leg of a vehicle-mounted security inspection system according to an exemplary embodiment of the present disclosure.

FIG. 16 shows a simplified schematic diagram of a supporting leg of a vehicle-mounted security inspection system according to an exemplary embodiment of the present disclosure.

According to an exemplary embodiment of the present disclosure, as shown in FIGS. 2 to 7 and 16, the vehicle 10 further includes at least four supporting legs 6 provided on the main body portion 1. Each supporting leg includes: a base 61 provided on the chassis 101; a first telescopic mechanism telescopically provided on the base 61; and a second telescopic mechanism pivotally provided at an end of the first telescopic mechanism. Each supporting leg 6 has a retracted state of retracting towards the main body portion 1 and an expanded state of extending towards the ground to support a weight of the vehicle 10. That is to say, in the expanded state, the supporting leg 6 extends to support on the ground, so as to support the weight of the entire vehicle-mounted security system 100 instead of the vehicle 14, thereby preventing the vehicle from moving forward and backward. Furthermore, a sensor used to measure a posture of the vehicle may be provided on the vehicle, so as to sense whether the vehicle is in a horizontal state or not. If the sensor detects that the vehicle is not in the horizontal state, a corresponding supporting leg may be controlled to rise or fall, so as to adjust the vehicle to the horizontal state, thereby improving an operation stability of the radiographic inspection apparatus.

According to an exemplary embodiment of the present disclosure, as shown in FIG. 16, the first telescopic mechanism includes a first hydraulic cylinder 62 provided on the base 1, and a first piston rod 63 that reciprocates linearly relative to the first hydraulic cylinder 62 under a driving of the first hydraulic cylinder 62. The second telescopic mechanism includes a second hydraulic cylinder 64 pivotally provided at the end of the first piston rod 63 around a pivot 66, and a second piston rod 65 that reciprocates linearly relative to the second hydraulic cylinder 64 under a driving of the second hydraulic cylinder 64. When the radiographic inspection apparatus of the vehicle-mounted security inspection system 100 is idle, the supporting leg 6 is in the retracted state, the first piston rod 63 is retracted into the first hydraulic cylinder 62, the second hydraulic cylinder 64 is pivoted to maintain level with the first piston rod 63, and the second piston rod 65 is retracted into the second hydraulic cylinder. When the radiation inspection apparatus of the vehicle-mounted security inspection system 100 is in an operating state of inspecting the object, the supporting leg 6 is in the expanded state, the first piston rod 63 extends out of the first hydraulic cylinder 62, the second hydraulic cylinder 64 is pivoted to maintain perpendicularity with the first piston rod 63, and the second piston rod 65 extends out of the second hydraulic cylinder and contacts the ground, thereby jacking up the vehicle 10, so that the wheels 14 leave the ground.

In a case shown in FIG. 4, if a deviation exists between a levelness measured by the level sensor 8 and the reference levelness, the controller determines that the vehicle is inclined towards a right front based on the deviation, and controls the second piston rod 65 of the supporting leg 6 at the upper left shown in FIG. 4 to further extend, thereby restoring the vehicle to the horizontal state.

In an exemplary embodiment, according to a center of gravity of the entire vehicle load and a specific shape of the chassis, two supporting legs located at the front of the vehicle are arranged behind the vehicle exhaust system and a battery of the vehicle, and two supporting legs located at a rear of the vehicle are disposed close to both sides of the horizontal framework for supporting the scanning device. The electrical energy used to control the extension and retraction of the supporting leg may be provided by the battery of the vehicle. According to an actual situation, the controller may control at least one of all supporting legs until all supporting legs perform extension and retraction operations, so as to achieve functions such as a jogging of single supporting leg and automatic leveling of all supporting legs with one button, automatic lowering of all supporting legs with one button, and automatic retraction of all supporting legs with one button. After the vehicle stops in place, the leveling function of the vehicle is started through the controller, and four groups of supporting legs extend outward at the same time. After landing, the expansion degrees of the four groups of supporting legs are fine-tuned according to the levelness measured by the level sensor, so that design requirements of the level of the vehicle are met.

Figure 17:
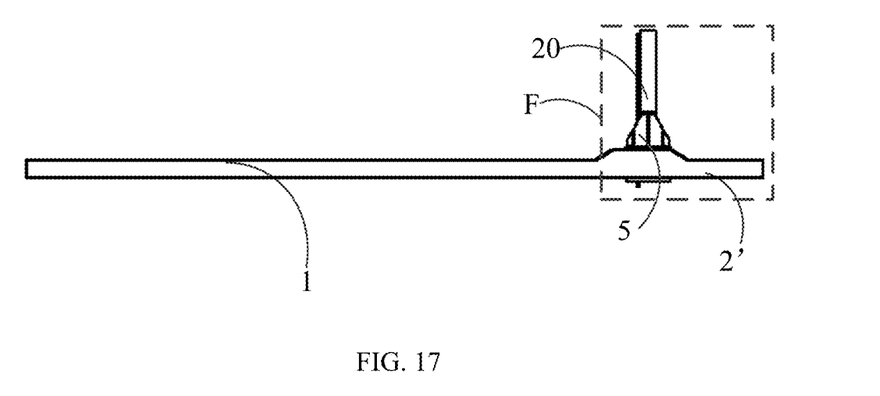
FIG. 17 shows a simplified side view of an interior of an vehicle-mounted security inspection system of another exemplary embodiment of the present disclosure.
Figure 18:
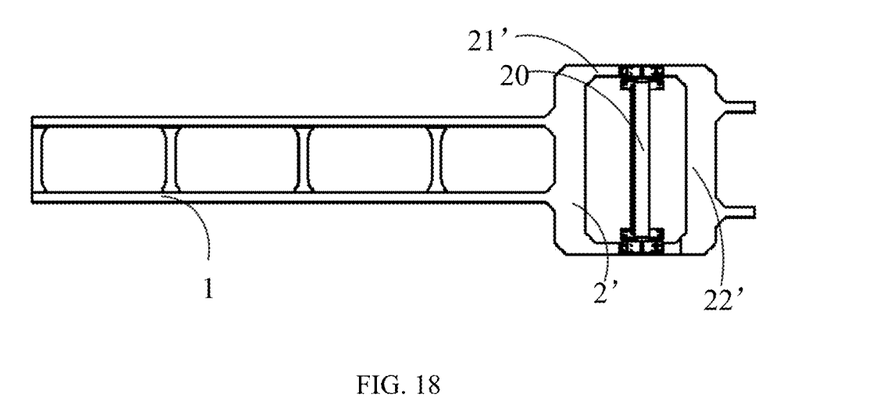
FIG. 18 shows a top view of the vehicle-mounted security inspection system shown in FIG. 17.
Figure 19:
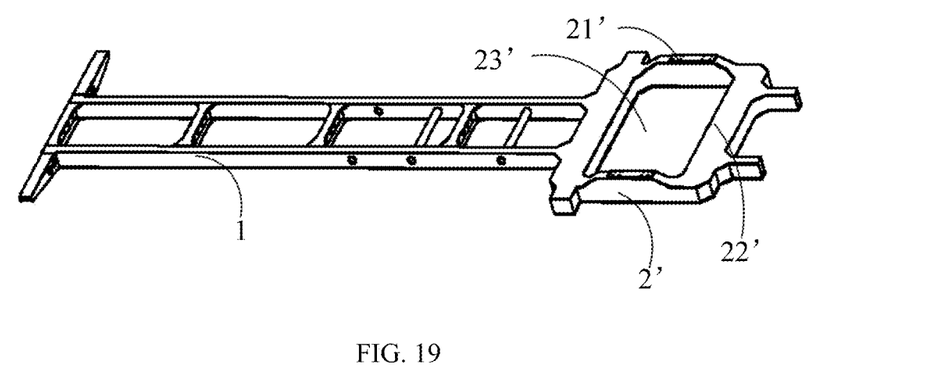
FIG. 19 shows a three-dimensional schematic diagram of a chassis of the vehicle-mounted security inspection system shown in FIG. 17.
Figure 20:
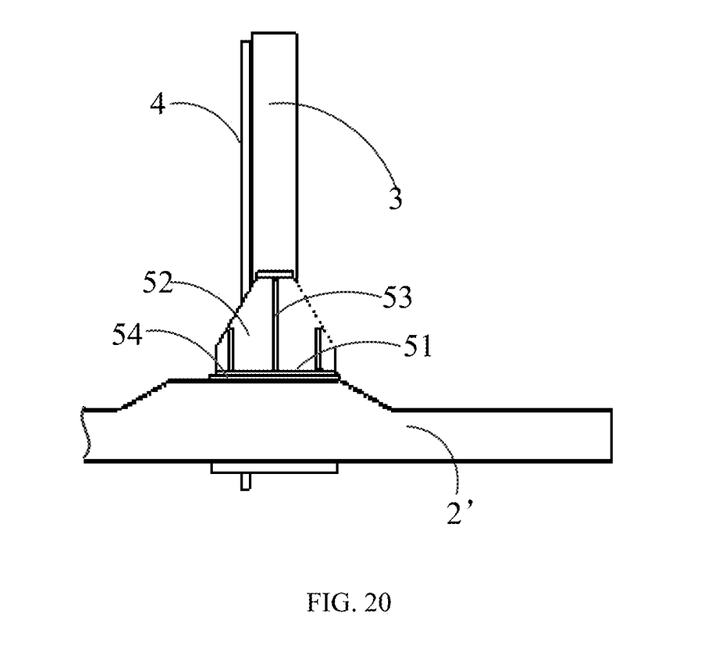
FIG. 20 shows an enlarged schematic diagram of part F shown in FIG. 17.

FIG. 17 shows a simplified side view of an interior of an vehicle-mounted security inspection system of another exemplary embodiment of the present disclosure. FIG. 18 shows a top view of the vehicle-mounted security inspection system shown in FIG. 17. FIG. 19 shows a three-dimensional schematic diagram of a chassis of the vehicle-mounted security inspection system shown in FIG. 17. FIG. 20 shows an enlarged schematic diagram of part F shown in FIG. 17.

In an exemplary embodiment, as shown in FIGS. 17 to 20, the chassis of the vehicle 10 includes a main body portion 1 placed horizontally; and a horizontal framework 2' integrally connected with the main body portion 1. The horizontal framework 2' includes a pair of longitudinal supporting beams 21' disposed in a travelling direction of the vehicle and a pair of lateral supporting frames 22'. The pair of longitudinal supporting beams 21' and the pair of lateral supporting frames 22' define a substantially rectangular accommodation space 23'. The scanning device 20 includes: an upright framework 3; a slip ring 4 rotatably provided on the upright framework 3; and two groups of connecting mechanisms 5 provided on both sides of the upright framework 3 respectively, and located between a lower end of the upright framework 3 and an upper end of the upright framework 3. The connecting mechanism 5 is used to mount the upright framework 3 on the longitudinal supporting beam 21', so that at least part of the upright framework 3 is lower than an upper surface of the horizontal framework 2'. That is to say, at least part of the lower portion of the upright framework 3 is accommodated in the accommodation space 23'.

Each group of connecting mechanisms 5 includes a horizontal arm 51 extending outward from an outer side of the upright framework 3 and supported on the lateral supporting beam 22'. In an exemplary embodiment, each group of connecting mechanisms 5 further includes: an upright arm 52 provided on an outer side of the upright framework 3. The horizontal arm 51 is connected to a lower end of the upright arm 52. In this way, a supporting strength of the horizontal arm 51 may be increased. Furthermore, each group of connecting mechanisms 5 includes a plurality of reinforcing ribs 53 connected between the upright arm 52 and the horizontal arm 51, so as to further increase the supporting strength of the horizontal arm 51. A backing plate 54 may be pre-welded on the longitudinal supporting beam 21' of the horizontal framework 2', so as to increase a supporting strength of the longitudinal supporting beam 21'. For example, the horizontal arm 51 of the connecting mechanism 5 may be fixed to the longitudinal supporting beam 21' by means of a bolt assembly.

In the embodiments shown in FIGS. 17 to 20, the level sensor may be provided on the upright framework 3 and/or the longitudinal supporting beam 21'.

According to the radiographic inspection apparatus and the vehicle-mounted security inspection system of embodiments of the present disclosure, when the radiographic inspection apparatus is in an idle state while the vehicle is travelling, the locking mechanism automatically lock the slip ring to prevent the slip ring from rotating, so as to prevent key components of the scanning device such as a radiation source and a detector array from being damaged during a movement of the vehicle. Furthermore, through a frictional force generated by a close contact between the contact portion and the outer ring of the slip ring in a radial direction, the slip ring is prevented from rotating relative to the upright framework. The locking mechanism may lock the slip ring at any time, and is not limited by a specific position of the slip ring, thereby improving a flexibility of braking the slip ring.

It may be understood by those of ordinary skill in the art that the above-described embodiments are exemplary, and those of ordinary skill in the art may improve them. The structures described in various embodiments may be combined freely in terms of structures or principles not conflicting with each other.

Although the present disclosure has been described with reference to accompanying drawings, embodiments disclosed in the accompanying drawings are intended to illustrate optional embodiments of the present disclosure, and should not be construed as a limitation of the present disclosure. Although embodiments of the present disclosure have been illustrated and described, it may be understood by those of ordinary skill in the art that these embodiments may be changed without departing from the principle and spirit of the present disclosure. The scope of the present disclosure is defined by the appended claims and their equivalents.

What is claimed is:

1. A radiographic inspection apparatus, comprising a scanning device, wherein the scanning device comprises:
   an upright framework;
   a slip ring rotatably provided on the upright framework; and
   a locking mechanism, comprising:
      a driving mechanism provided on the upright framework; and
      a contact portion provided on the driving mechanism to come into contact with an outer ring of the slip ring under a driving of the driving mechanism, so as to prevent the slip ring from rotating relative to the upright framework,
   wherein the driving mechanism comprises: a connecting rod, wherein a first end of the connecting rod is pivotally connected to the upright framework, and the contact portion is pivotally connected between the first end of the connecting rod and a second end of the connecting rod.

2. The radiographic inspection apparatus of claim 1, wherein the contact portion comprises:
   a base portion connected to the driving mechanism; and
   a resilient pad provided on the base portion and configured to be in contact with the outer ring of the slip ring resiliently.

3. The radiographic inspection apparatus of claim 2, wherein the driving mechanism further comprises:
   a driver provided on the upright framework; and
   a driving rod connected between the driver and the second end of the connecting rod, and configured to reciprocate linearly relative to the driver under a driving of the driver so as to drive the connecting rod to pivot relative to the upright framework.

4. The radiographic inspection apparatus of claim 3, wherein the driving mechanism further comprises a buffer device provided between the driving rod and the second end of the connecting rod.

5. The radiographic inspection apparatus of claim 4, wherein the buffer device comprises:
   a sleeve having a first end pivotally connected to the connecting rod; and
   a spring provided in the sleeve, wherein an end of the driving rod is inserted into the sleeve so as to drive the sleeve to move by biasing the spring.

6. The radiographic inspection apparatus of claim 5, wherein the buffer device further comprises:
   an end cover provided on the sleeve;
   a connecting block provided at the end of the driving rod, wherein the connecting block is inserted into the sleeve through the end cover and abuts against the spring.

7. The radiographic inspection apparatus of claim 6, wherein the connecting block is provided with a flange, and wherein the flange protrudes radially outward and is located on an inner side of the end cover.

8. The radiographic inspection apparatus of claim 3, wherein a limiting rod is provided between the second end of the connecting rod and a position where the connecting rod is connected to the contact portion, and
   wherein the base portion is provided with a limiting block configured for receiving the limiting rod.

9. The radiographic inspection apparatus of claim 3, wherein the locking mechanism further comprises:
   a first proximity switch provided on the upright framework; and
   a mating switch provided on the connecting rod, wherein the driver is configured to stop driving the contact portion to move further toward the slip ring in response to the mating switch approaching the first proximity switch.

10. The radiographic inspection apparatus of claim 9, wherein the locking mechanism further comprises:
    a second proximity switch provided on the upright framework, wherein the driver is configured to stop driving the contact portion to move further away from the slip ring in response to the mating switch approaching the first proximity switch.

11. The radiographic inspection apparatus of claim 3, wherein the locking mechanism further comprises:
    a first mounting seat provided on the upright framework, wherein the driver is provided on the first mounting seat; and
    a second mounting seat provided on the upright framework, wherein the first end of the connecting rod is pivotally connected to the second mounting seat.

12. A vehicle-mounted security inspection system, comprising:
    a vehicle; and
    a radiographic inspection apparatus of claim 1, provided on a chassis of the vehicle.

13. The vehicle-mounted security inspection system of claim 12, wherein the chassis comprises:
    a main body portion; and
    a horizontal framework integrally connected with the main body portion, wherein the horizontal framework comprises a pair of longitudinal supporting beams and a pair of lateral supporting beams, the upright framework is provided on one of the longitudinal supporting beam or the lateral supporting beam, and at least part of the upright framework is lower than an upper surface of the horizontal framework.

14. The vehicle-mounted security inspection system of claim 13, wherein the upright framework is provided on the horizontal framework through two groups of connecting mechanisms,
    each group of connecting mechanisms comprises a horizontal arm extending outward from an outer side of the upright framework and supported on the longitudinal supporting beam or the lateral supporting beam.

15. The vehicle-mounted security inspection system of claim 14, wherein each group of connecting mechanisms further comprises an upright arm provided on an outer side of the upright framework, and the horizontal arm is connected to a lower end of the upright arm.

16. The vehicle-mounted security inspection system of claim 15, wherein each group of connecting mechanisms further comprises a plurality of reinforcing ribs connected between the upright arm and the horizontal arm.

17. The vehicle-mounted security inspection system of claim 14, wherein the two groups of connecting mechanisms are provided on both sides of the upright framework, respectively, and located between a lower end of the upright framework and an upper end of the upright framework, so that at least part of the upright framework is lower than an upper surface of the horizontal framework.

18. The vehicle-mounted security inspection system of claim 13, wherein a height of the main body portion from a ground is greater than a height of the horizontal framework from the ground.

19. The vehicle-mounted security inspection system of claim 12, wherein the vehicle comprises: a plurality of supporting legs provided on the chassis, and wherein each supporting leg is in a retracted state of retracting towards the chassis or in an expanded state of extending towards a ground to support a weight of the vehicle.

20. The vehicle-mounted security inspection system of claim 19, further comprising:
    a level sensor configured to detect a levelness of the scanning device; and
    a controller configured to adjust an expansion degree of at least one of the plurality of supporting legs according to the levelness measured by the level sensor, so that the scanning device remains in a predetermined posture.

* * * * *